(12) United States Patent
Watarai et al.

(10) Patent No.: US 8,720,300 B2
(45) Date of Patent: May 13, 2014

(54) GEAR SHIFT OPERATING DEVICE

(75) Inventors: Etsuyoshi Watarai, Osaka (JP); Kanji Kirimoto, Osaka (JP); Kenji Ose, Osaka (JP); Kazutaka Fukao, Osaka (JP); Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 899 days.

(21) Appl. No.: 12/821,207

(22) Filed: Jun. 23, 2010

(65) Prior Publication Data

US 2011/0154939 A1    Jun. 30, 2011

(30) Foreign Application Priority Data

Dec. 28, 2009 (JP) ................................. 2009-297758

(51) Int. Cl.
    *B62M 25/04* (2006.01)
(52) U.S. Cl.
    USPC ........................................... 74/502.2; 74/489
(58) Field of Classification Search
    USPC ................ 74/473.14, 489, 502.2, 551.8; 248/226.11, 230.1, 231.21; 280/288.4
    IPC ....................................................... B62M 25/04
    See application file for complete search history.

(56) References Cited

U.S. PATENT DOCUMENTS

| | | | |
|---|---|---|---|
| 1,551,823 A * | 9/1925 | Guy | 74/502.2 |
| 4,974,469 A * | 12/1990 | Romano | 74/502.2 |
| 5,370,412 A * | 12/1994 | Chou | 280/288.4 |
| 6,276,227 B1 * | 8/2001 | Ose | 74/489 |
| 7,841,258 B2 * | 11/2010 | Cesur et al. | 74/501.6 |
| 2002/0078781 A1 * | 6/2002 | Chen | 74/502.2 |
| 2006/0053940 A1 | 3/2006 | McLaughlin et al. | |
| 2007/0199401 A1 | 8/2007 | Kawakami et al. | |

* cited by examiner

*Primary Examiner* — Thomas Diaz
(74) *Attorney, Agent, or Firm* — Global IP Counselors

(57) ABSTRACT

A bicycle gear shift operating device is a device configured to be mounted to a handlebar. The bicycle gear shift operating device includes at least one operating lever, a support member that supports the operating member and a mounting member that supports the support member on a handlebar. The mounting member has a mounting portion configured to be attached to the handlebar and a fastening portion that is configured to fasten the support member. The mounting member is configured to be selectively fasten the support member in either a first mounting orientation in which the fastening portion is offset in a first axial direction of the handlebar from the middle portion or a second mounting orientation in which the support member is offset in a second axial direction that is opposite the first axial direction.

3 Claims, 12 Drawing Sheets

GEAR SHIFT OPERATING DEVICE

CROSS-REFERENCE TO RELATED APPLICATIONS

This application claims priority under 35 U.S.C. §119 to Japanese Patent Application No. 2009-297758, filed Dec. 28, 2009. The entire disclosure of Japanese Patent Application No. 2009-297758 is hereby incorporated herein by reference.

BACKGROUND

1. Field of the Invention

This invention generally relates to a bicycle operating device. More specifically, the present invention relates to a bicycle gear shifter for operating a gear changing device of a bicycle.

2. Background Information

A gear shift operating device is connected to a gear changing device with, for example, a Bowden-type gear shift cable. The gear shift operating device is configured and arranged to allow a user to operate the gear changing device by operating, for example, a lever or other such operating member. A conventional gear shift operating device has an operating member, a support member serving to support the operating member, and a mounting member that is formed as an integral unit with the support member and configured and arranged to be fastened to a handlebar. Conventionally, the gear shift operating device is attached to the handlebar on an inward side of a bracket of a brake lever when the gear shift operating device is provided as a separate entity from the brake lever. When the gear shift operating device is attached to the handlebar on an inward side of the brake lever, the gear shift operating device can be difficult to operate depending on the shape of the operating member of the gear shift operating device.

A known gear shift operating device is configured such that the support member can be moved with respect to the bracket such that either of two different mounting positions can be selected along an axial direction of the handlebar (see European Patent Publication No. EP1623918). This conventional gear shift operating device includes an operating member, a support member having two threaded holes formed therein, and a mounting member configured to be fastened to the support member with bolt installed into either of the two threaded holes of the support member. The threaded holes are arranged spaced apart in an axial direction of the handlebar. The mounting member has a circular mounting hole and a slit for fastening the mounting hole to the handlebar. A bold is passed through the slit and screwed into one of the two threaded holes. Thus, with the conventional gear shift operating device, the mounting member is fastened to the handlebar simultaneously when the support member is fastened to the fastening member.

SUMMARY

With the conventional configuration described above, mounting the device to the handlebar is simple because a single bolt is used both to fasten the support member to the mounting member and to fasten the mounting member to the handlebar. However, if the bolt loosens due to vibration of the bicycle, there is a possibility that the mounting member will move along an axial direction of the handlebar.

One object of the present disclosure is to provide a gear shift operating device that makes it possible to change a mounting position of the gear shift operating device easily and to ensure that the gear shift operating device does not move easily after it is mounted.

In accordance with a first aspect of the present disclosure, a gear shift operating device is proposed that includes an operating member, a support member and a mounting member. The support member supports the operating member. The mounting member is attached to the support member. The mounting member includes handlebar mounting portion and a fastening portion. The handlebar mounting portion is configured to define a handlebar mounting axis. The fastening portion extends from the handlebar mounting portion such that the fastening portion is fastened to the support member at a position offset in an axial direction of the handlebar mounting axis from an axial middle location of the mounting portion with the axial middle location of the mounting portion being defined with respect to the axial direction of the handlebar mounting axis. The fastening portion and the support member are selectively arranged with respect to each other between a first mounting orientation in which the fastening portion is offset in a first axial direction of the handlebar mounting axis from the middle location and a second mounting orientation in which the support member is offset in a second axial direction that is opposite the first axial direction.

With this gear shift operating device of the first aspect of the present disclosure, the mounting member is set to either the first mounting orientation or the second mounting orientation before the mounting member is attached to the handlebar. The support member is fastened to the fastening portion after the mounting member has been attached to the handlebar in the selected orientation. Since the fastening portion is arranged to be offset from a middle portion of the mounting portion, the axial position of the fastening portion is offset from the middle portion of the mounting portion in opposite directions depending on whether the mounting portion is attached in the first mounting orientation or the second mounting orientation. The position of the fastening portion along an axial direction of the handlebar changes depending on whether the mounting member is attached in the first mounting orientation or the second mounting orientation. Therefore, the mounting position of a gear shift operating device can be changed easily by changing the orientation of the mounting member between the first mounting orientation and the second mounting orientation. Also, the fastening of the mounting member to the handlebar and the fastening of the support member to the mounting member take place at different portions of the mounting member. Thus, even if the connection between the support member and the mounting member loosens, the gear shift operating device will easily not move in an axial direction of the handlebar after it has been mounted.

In accordance with a second aspect of the present disclosure, the gear shift operating device according to the first aspect of the present disclosure is further configured such that the fastening portion is arranged with a centerline that is aligned with a plane that emanates radially from the handlebar mounting axis. Since the fastening portion is arranged to be aligned with a plane emanating radially from a handlebar mounting axis, the position of the fastening portion with respect to an axis of the handlebar is substantially unchanged regardless of whether the mounting member is attached in the first mounting orientation or the second mounting orientation. Thus, if the mounting member is changed from the first mounting orientation to the second mounting orientation or from the second mounting orientation to the first mounting orientation, then the position of the fastening portion will change only in an axial direction of the handlebar.

In accordance with a third aspect of the present disclosure, a gear shift operating device is proposed that includes an operating member, a support member and a mounting member. The support member supports the operating member. The mounting member includes handlebar mounting portion and a fastening portion. The handlebar mounting portion is configured to define a handlebar mounting axis. The fastening portion extends from the handlebar mounting portion such that the fastening portion is pivotally fastened to the support member about an axis that is not parallel to the handlebar mounting axis.

In this gear shift operating device of the third aspect of the present disclosure, the fastening portion of the mounting member is fixed to the mounting portion such that the fastening portion can be pivoted about an axis not parallel to the handlebar mounting axis. Thus, the position of the fastening portion with respect to the mounting portion along an axial direction of the handlebar can be changed by changing the pivot angle of the fastening portion. If the fastening portion is pivoted from one position to another position that is linearly symmetrical to the one position with respect to a straight line passing through a pivot center, then the pivot angle can be changed while keeping a distance between the fastening portion and the axis of the handlebar constant. Also, the fastening of the mounting member to the handlebar and the fastening of the support member to the mounting member take place at different portions of the mounting member. Thus, even if the connection between the support member and the mounting member loosens, the gear shift operating device will not easily move in an axial direction of the handlebar after it has been mounted.

In accordance with a fourth aspect of the present disclosure, the gear shift operating device according to any one of the first to third aspects of the present disclosure is further configured such that the support member includes a rotation preventing portion that prevents rotation of the support member with respect to the mounting member. With this fourth aspect of the present disclosure, the support member does not rotate with respect to the mounting member because the rotational preventing portion prevents the support member from rotating with respect to the mounting member. As a result, the support member does not easily move with respect to the mounting portion.

In accordance with a fifth aspect of the present disclosure, a gear shift operating device is proposed that includes an operating member, a support member and a mounting member. The support member supports the operating member. The support member a first mounting surface and a second mounting surface, with the second mounting surface being separated from the first mounting surface in an axial direction of a handlebar, and the second mounting surface lying in a different plane from the first mounting surface. The mounting member is attached to the support member. The mounting member including a handlebar mounting portion and a fastening portion. The handlebar mounting portion is configured to define a handlebar mounting axis. The fastening portion of the mounting member is selectively fastened to the first mounting surface to obtain a first mounting orientation and fastened to the second mounting surface to obtain a second mounting orientation that is different from the first mounting orientation.

In this gear shift operating device of the fifth aspect of the present disclosure, the support member has a first mounting surface and a second mounting surface that does not lie in the same plane as the first mounting surface. The two mounting surfaces are arranged in different planes and separated from each other along an axial direction of the handlebar. Thus, the relative positions of the two mounting surfaces shift in an axial direction of the handlebar depending on whether the fastening portion is attached to the first mounting surface or to the second mounting surface. As a result, the mounting position of the gear shift operating device can be changed easily by changing whether the first mounting surface or the second mounting surface is fastened against the fastening portion. Also, the fastening of the mounting member to the handlebar and the fastening of the support member to the mounting member take place at different portions of the mounting member. Thus, even if the connection between the support member and the mounting member loosens, the gear shift operating device will not easily move after it has been mounted.

In accordance with a sixth aspect of the present disclosure, the gear shift operating device according to the fifth aspect of the present disclosure is further configured such that the support member includes an adjusting member with the second mounting surface being formed by the adjusting member. With this sixth aspect of the present disclosure, the axial position of the gear shift operating device can be changed even more easily by selecting to fasten the support member directly to the fastening portion using the first mounting surface or to fasten the support member to the fastening portion through the adjusting member using the second mounting surface.

In accordance with a seventh aspect of the present disclosure, the gear shift operating device according to the fifth aspect of the present disclosure is further configured such that fastening portion of the mounting member has a first fastening surface that is fastened directly against the first mounting surface of the support member and a second fastening surface that is fastened directly against the second mounting surface of the support member. With this seventh aspect of the present disclosure, the axial position of the gear shift operating device can be changed easily by selecting to fasten the support member to the fastening portion such that the first mounting surface contacts the first fastening surface or to fasten the support member to the fastening portion such that the second mounting surface contacts the second fastening surface.

In accordance with an eighth aspect of the present disclosure, a gear shift operating device set is provided with a first gear shift operating device, a second gear shift operating device, a first mounting member and a second mounting member. The first gear shift operating device operates a first gear changing device. The first gear shift operating device includes a first operating member and a first support member supporting the first operating member, with the first support member including a first attachment portion. The second gear shift operating device operates a second gear changing device. The second gear shift operating device includes a second operating member and a second support member supporting the second operating member, with the second support member including a second attachment portion. The first mounting member includes a first handlebar mounting portion that defines a first handlebar mounting axis and a first fastening portion that is selectively attached to one of the first and second attachment portions of the first and second support members. The second mounting member includes a second handlebar mounting portion that defines a second handlebar mounting axis and a second fastening portion that is selectively attached to the first and second attachment portions of the first and second support members such that the first and second handlebar mounting axes are coincident with respect to the first support member while in installed positions on the first support member and such that the first and second handlebar mounting axes are coincident with respect to the second support member while in installed positions on the second support member. The first and second mounting members are configured such that the first and second fastening portions are selectively located at different axial positions on the first support member with respect to the first and second handlebar mounting axes while in the installed positions on the first support member. The first and second mounting members are further configured such that the first and second fastening portions are selectively located at different axial positions on the second support member with respect to the first and second handlebar mounting axes while in the installed positions on the second support member.

Thus, with this gear changing device operating set, the first attachment portion of the first support member of the first gear shift operating device (which serves to operate the first gear changing device) can be fastened to either the first and second mounting members. Similarly, the second attachment portion of the second support member of the second gear shift operating device (which serves to operate the second gear changing device) can be fastened to either the first and second mounting members. With this aspect of the present disclosure, the mounting position of the set can be changed easily by selecting to fasten either first mounting member or second mounting member to the first attachment portion of the first support member, and by selecting to fasten either first mounting member or second mounting member to the second attachment portion of the second support member. Also, the fastening of the mounting member to a bicycle and the fastening of the support member to the mounting member take place at different portions of the mounting member. Thus, even if the connection between the support member and the mounting member loosens, the gear shift operating device will not easily move after it has been mounted.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
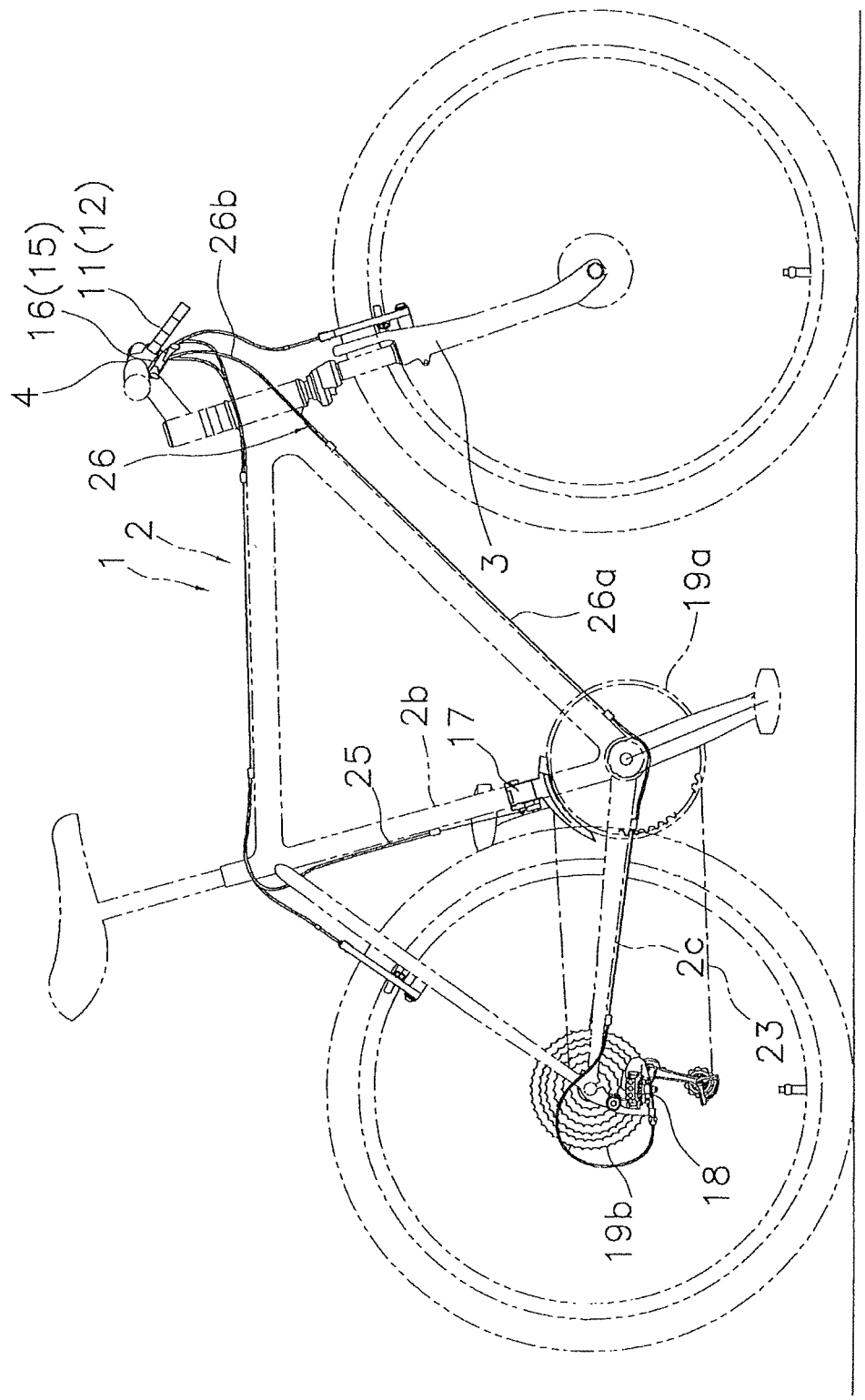
FIG. 1 is a side elevational view of a bicycle that is equipped with a bicycle operating device (e.g., a bicycle gear shifter) in accordance with a first embodiment.

Referring initially to FIG. 1, a bicycle 1 is illustrated that is equipped in accordance with a first embodiment. The bicycle 1 includes among other things a frame 2, a suspension fork 3 and a handlebar 4. The handlebar 4 is fixed to an upper portion of the suspension fork 3. The bicycle 1 further includes a front shifter unit 15 and a rear gear shifter unit 1. The front and rear gear shifter units 15 and 16 are configured such that it possible to change a mounting position of the front and rear gear shifter units 15 and 16 easily and to ensure that the front and rear gear shifter units 15 and 16 do not move easily after they are mounted. The front and rear gear shifter units 15 and 16 are examples of gear shift operating devices.

A front derailleur 17 is installed on a middle portion of the frame 2 as an external gear changing device. A rear derailleur 18 is installed on a rearward end portion of the frame 2. The derailleurs 17 and 18 are examples of gear changing devices. The front and rear derailleurs 17 and 18 are mounted on the frame 2. In particular, for example, the front derailleur 17 mounted on a lower portion of a seat tube 2b of the frame 2 for guiding a chain 23 onto any one of a plurality of sprockets (e.g., three sprockets) of a front chain wheel cluster 19a. The rear derailleur 18 is mounted on a rearward end portion of a chain stay 2c of the frame 2 and for guiding the chain 23 onto any one a plurality of sprockets (e.g., eight sprockets) of a rear chain wheel cluster 19b. The front derailleur 17 is connected to a front gear shifter unit 15 with a front gear shift cable 25. The rear derailleur 18 is connected to a rear gear shifter unit 16 with a rear gear shift cable 26.

The front gear shifter unit 15 is arranged on the handlebar 4 in close proximity to a rear brake lever 12 in a position on an inward side of the rear brake lever 12. The rear gear shifter unit 16 is arranged on the handlebar 4 in close proximity to a front brake lever 11 in a position on an inward side of the front brake lever 11. The front and rear gear shifter units 15 and 16 are configured to be substantially mirror images of each other and have substantially the same constituent features and operation, except for being configured to shift among a different number of gears. Therefore, the following explanation of the constituent features and operation will focus on the rear gear shifter unit 16 only.

As shown in FIGS. 2, 3, 4, and 5, the rear gear shifter unit 16 is configured to be fastened to the handlebar 4 of the bicycle 1. The rear gear shifter unit 16 includes a first shift (winding) lever 28, a second shift (release) lever 29, a support member 30 configured to support the winding lever 28 and the release leaver 29, and a mounting member 32 for fastening the support member 30 to the handlebar 4. The first and second shift levers 28 and 29 are examples of operating members. In the illustrated embodiment, the support member 30 has two housing parts with the first and second shift levers 28 and 29 pivotally mounted with respect to the support member 30.

Figure 7:
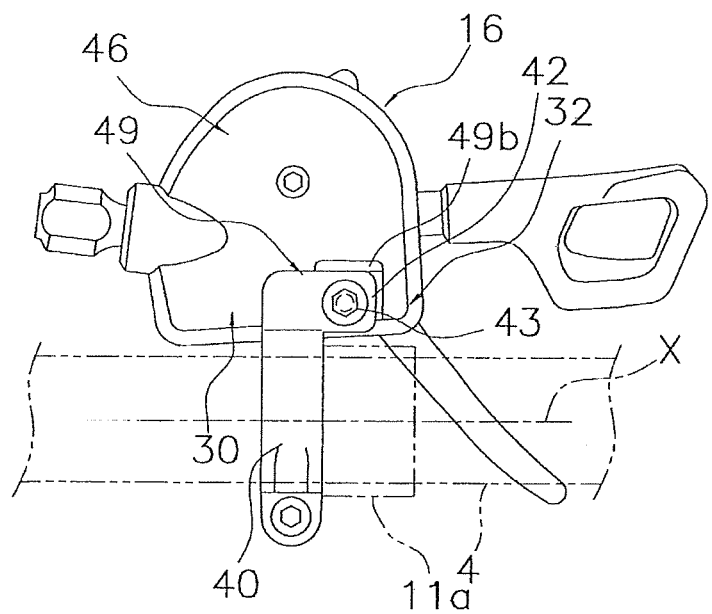
FIG. 7 is a top plan view showing the rear gear shifter unit mounted to a handlebar in a second mounting orientation.

The mounting member 32 is configured and arranged to be selectively fastened to the handlebar 4 either in a first mounting orientation (FIGS. 2 to 6) or in a second mounting orientation (FIG. 7). In the first mounting orientation (FIGS. 2 to 6), the mounting member 32 is arranged on an outward side of a front brake bracket 11a of the front brake lever 11. In the second mounting orientation (FIG. 7) the mounting member 32 is arranged on an inward side of a front brake bracket 11a. The mounting member 32 has a mounting portion 40, a clamp bolt 41, a fastening portion 42 and a fastening bolt 43. The mounting portion 40 is configured to be mounted to the handlebar 4. The fastening portion 42 is formed as an integral unit with the mounting portion 40 as a one-piece unitary member. The fastening portion 42 is configured to be fastened the support member 30 by the fastening bolt 43 or other suitable fastener. The mounting portion 40 includes a mounting hole 40a, a slit 40b, and first and second clamping portions 40c and 40d. The mounting hole 40a is configured (e.g., circular) such that the handlebar 40 can pass through mounting hole 40a. The slit 40b extends in a radial direction from a periphery of the mounting hole 40a. The first and second clamping portions 40c and 40d protrude in a radial direction along opposite sides of the slit 40b. The mounting portion 40 is attached to the handlebar 4 by tightening the clamp bolt 41. Specifically, in the illustrated embodiment, the clamp bolt 41 pass through the second clamping portion 40d and id threaded into the first clamping portion 40c such that the clamp bolt 41 crosses the slit 40b. Then the clamp bolt 41 is tightened such that the slit 40b narrows.

Figure 3:
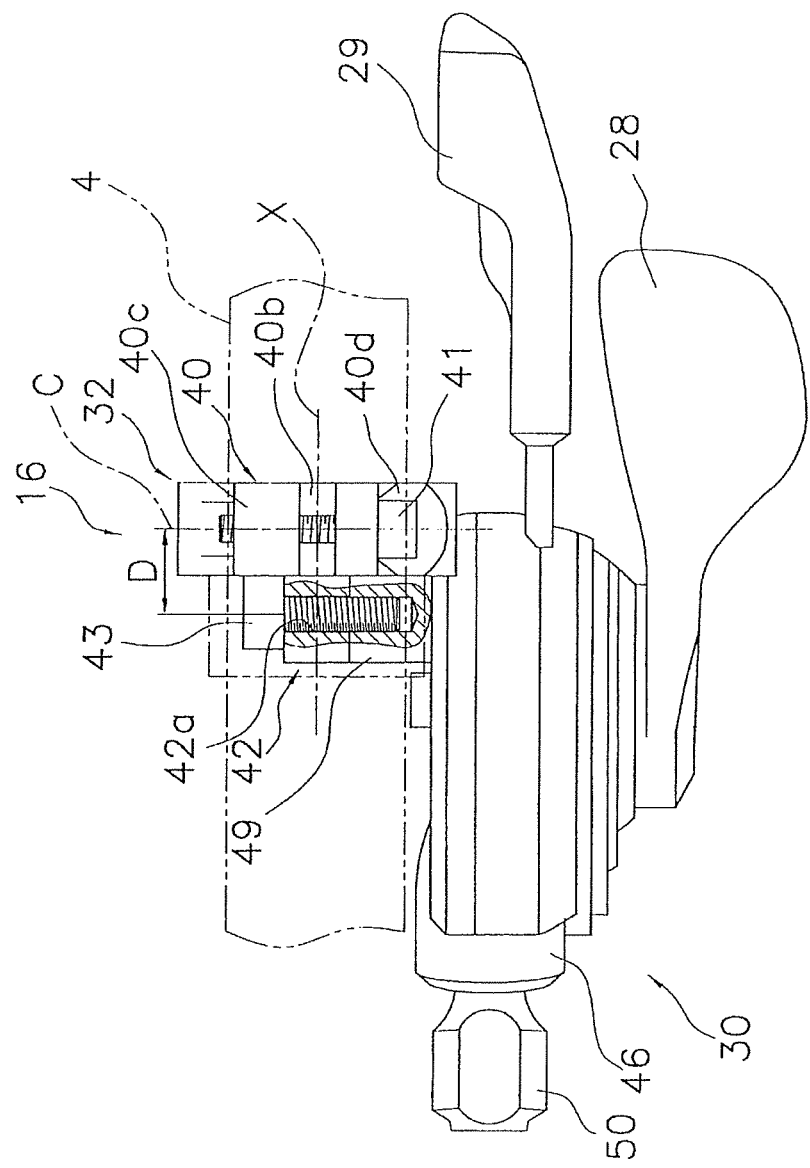
FIG. 3 is a rear view of the rear gear shifter unit illustrated in FIG. 2 according to the first embodiment.
Figure 4:
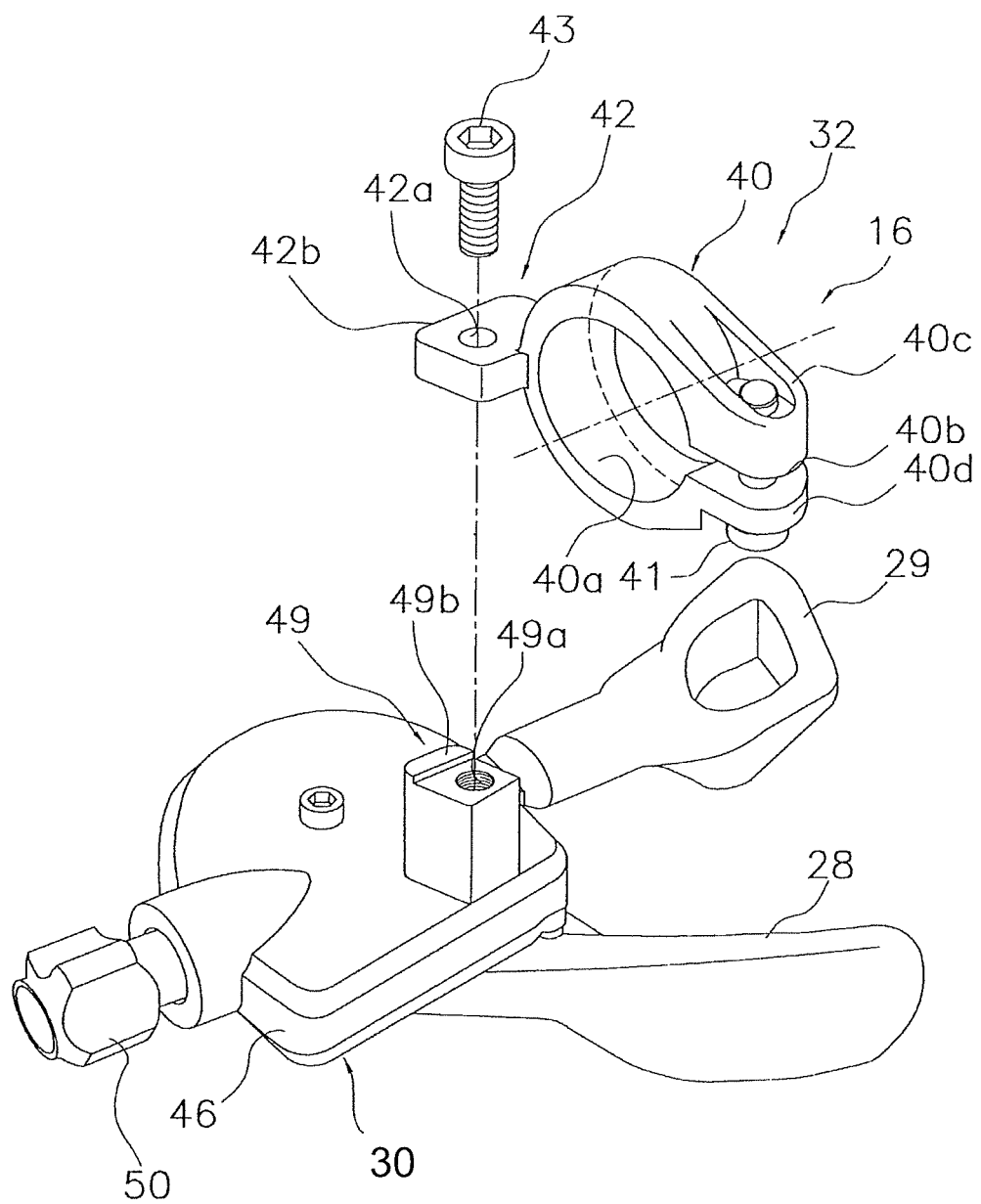
FIG. 4 is an exploded view of a mounting member and a support member of the rear gear shifter unit illustrated in FIGS. 2 and 3.
Figure 5:
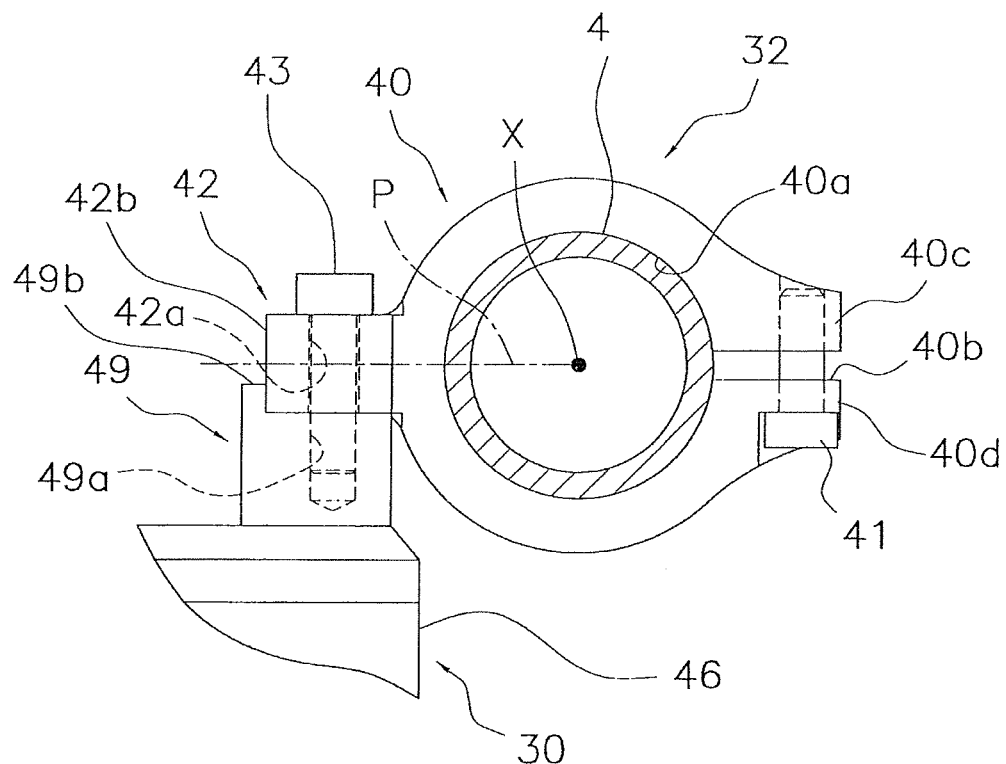
FIG. 5 is a side view of the same mounting member.
Figure 6:
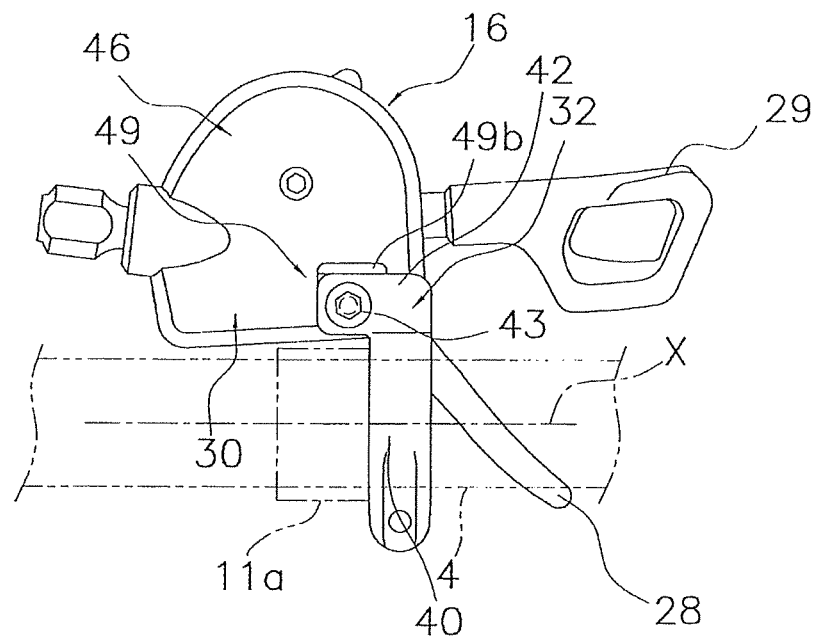
FIG. 6 is a top plan view showing the rear gear shifter unit mounted to a handlebar in a first mounting orientation.

As shown in FIG. 5, the fastening portion 42 is arranged to be aligned with a plane P emanating radially from an axis X (axial centerline) of the handlebar 4. As shown in FIGS. 4 and 5, the fastening portion 42 is a plate-like portion having a fastening hole 42a provided in a tip end portion. The fastening bolt 43 passes through fastening hole 42a and is threaded into a portion of the support member 30 as discussed below. As shown in FIG. 3, the fastening hole 42a is formed in such a position that when the mounting member 32 is in the first mounting orientation, the fastening hole 42a is offset by a distance D in a leftward axial direction (leftward from the perspective of FIG. 3, exemplifies a first axial direction) of the axis X of the handlebar 4 from a middle portion C corresponding to a lengthwise middle of the mounting portion 40 as measured along the axis X. The mounting member 32 can be selectively attached in either a first mounting orientation (shown in FIG. 6) in which the fastening portion 42 is offset from the middle portion C in a first axial direction of the handlebar 4 (leftward direction in FIG. 6) or a second mounting orientation (shown in FIG. 7) in which the fastening portion 42 is offset from the middle portion in a second axial direction that is opposite the first axial direction (rightward direction in FIG. 7). The support member 30 can be attached in substantially the same manner regardless of which orientation of the mounting member 32 is selected. When the mounting member 32 is attached in the first mounting orientation, the first clamping portion 40c is arranged above the second clamping portion 40d. When the mounting member 32 is attached in the second mounting orientation, the second clamping portion 40d is arranged above the first clamping portion 40c.

Figure 2:
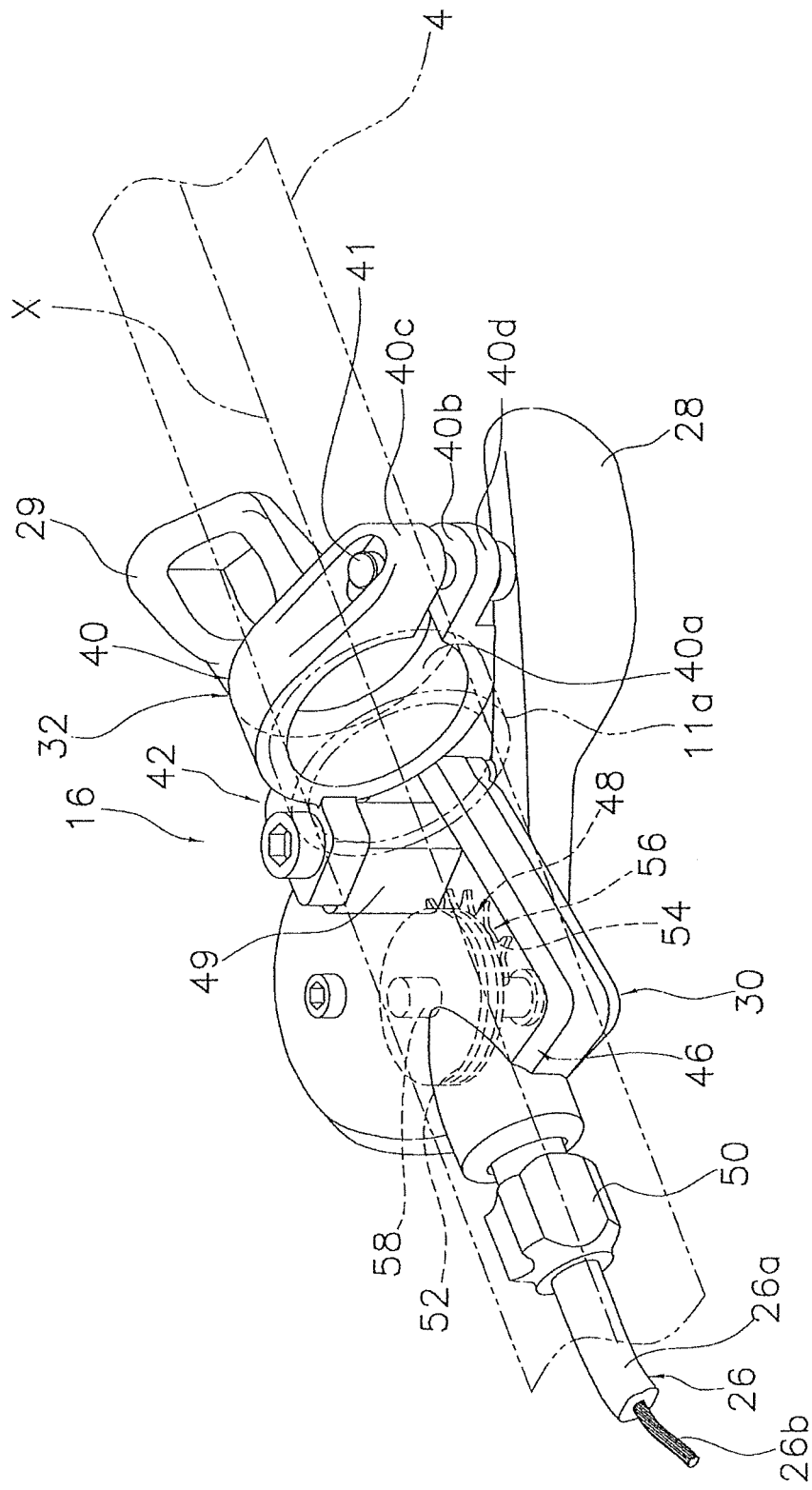
FIG. 2 is a perspective view of a rear gear shifter unit according to the first embodiment that is mounted to a handlebar.

As shown in FIG. 2, the support member 30 includes a housing 46 and a gear shifting mechanism 48. The housing 46 is configured to be fastened to the mounting member 32. The gear shifting mechanism 48 is installed inside the housing 46. The housing 46 has an outer casing stop 50 configured to hold an outer casing 26a of the rear gear shift cable 26.

The gear shifting mechanism 48 includes a winding body 52 and a positioning mechanism 56. The winding body 52 is configured to wind an inner cable 26b of the rear gear shift cable 26. The positioning mechanism 56 includes a positioning member 54 configured and arranged to selectively position the winding body 52 in the plurality of shift positions. The winding body 52 and the positioning member 54 are supported on a shaft member 58. The shaft member 58 is supported in the housing 46. The winding body 52 and the positioning member 54 can pivot about the shaft member 58. The winding lever 28 and the release lever 29 are connected to the gear shifting mechanism 48. The winding lever 28 serves to turn the positioning member 54 in a cable winding direction by an amount corresponding to one or a plurality of shift positions, and the release lever 29 serves to turn the positioning member 54 in a cable releasing direction. The winding lever 28 and the release lever 29 are pivotally mounted in the housing 46.

As shown in FIGS. 4 and 5, an upper surface of the housing 46 is provided with a mounting bracket 49 for fastening the housing 46 to the fastening portion 42. The mounting bracket 49 protrudes upward, and integrally formed as a one-piece, unitary member with the housing 46 as illustrated, or can be formed as a separate member from the housing 46. The mounting bracket 49 serves to separate the housing 46 from the handlebar 4, and make it easier to operate the release lever 29. The mounting bracket 49 is provided with a threaded hole 49a that is configured to threadedly engage the fastening bolt 43. The mounting bracket 49 is also provided with a rotation preventing portion 49b for preventing rotation of the support member 30. The rotation preventing portion 49b is a protrusion configured to contact an outside surface 42b of the fastening portion 42.

With this rear gear shifter unit 16, the fastening portion 42 is arranged at the same distance from the axis X of the handlebar 4 whether the mounting member 32 is attached in the first mounting orientation or the inverted second mounting orientation shown in FIG. 7. The support member 30 is arranged on one side of the middle portion C (corresponding to an axial lengthwise middle of the mounting portion 40) when the mounting member 32 is attached in the first mounting orientation and the opposite side of the middle portion C when the mounting member 32 is attached in the second mounting orientation. As explained previously, when the mounting member 32 is in the first mounting orientation, the mounting portion 40 is arranged on an outward side of the front brake bracket 11a. Meanwhile, when the mounting member 32 is in the second mounting orientation, the mounting portion 40 is arranged on an inward side of the front brake bracket 11a. In this way, even if the attached position of the mounting portion 40 is changed with respect to the front brake bracket 11a, the shift levers 28 and 29 can be arranged in a position where they are easy to operate. As a result, a rider can attach the rear gear shifter unit 16 and the front gear shifter unit 15 in positions where they are easier to operate in accordance with the shapes of the front brake lever 11 and the rear brake lever 12.

Figure 8:
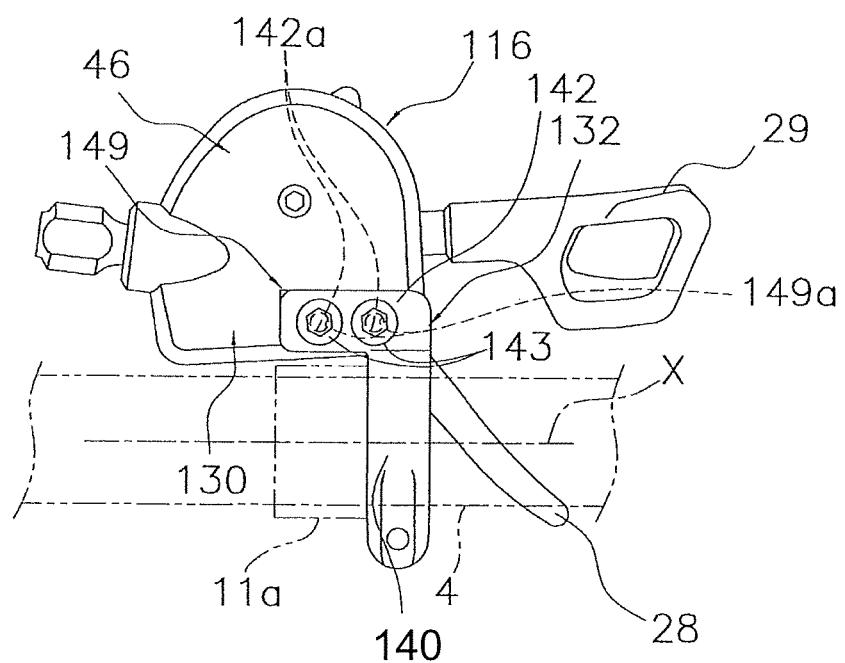
FIG. 8 shows a variation of the first embodiment and corresponds to FIG. 6.
Figure 9:
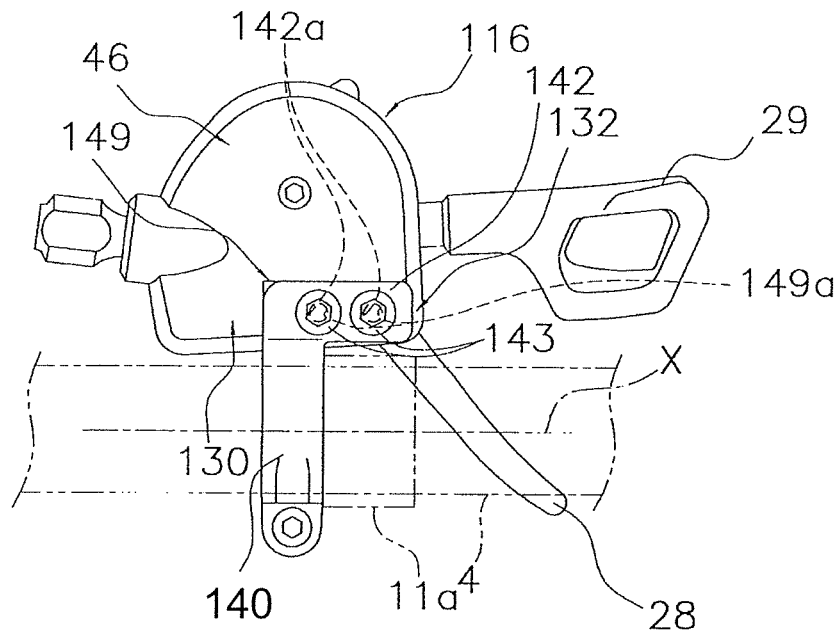
FIG. 9 shows a variation of the first embodiment and corresponds to FIG. 7.

Although only one fastening bolt is used in the previously explained embodiment, it is acceptable to fasten a support member 130 with two fastening bolts 143 as shown in FIGS. 8 and 9. In the variation shown in FIGS. 8 and 9, a mounting member 132 has a mounting portion 140 and a fastening portion 142. The fastening portion 142 has two fastening holes 142a for receiving two fastening bolts 143. The mounting bracket 149 has two threaded holes 149a that are configured to threaded engage the two fastening bolts 143. The threaded holes 149a have the same spacing in-between as exists between the two fastening holes 142a. Since two threaded holes 149a are formed in the mounting bracket 149, which is provided on the housing 146 of the support member 130, it is not necessary to provided a separate rotation preventing portion to prevent rotation of the support member 130. However, it is acceptable to provide a rotation preventing portion for positioning purposes. Otherwise, the constituent features are the same as the first embodiment.

Similarly to the first embodiment, with this variation, a rider can attach a rear gear shifter unit 116 and a front gear shifter unit 115 in positions where they are easier to operate in accordance with the shapes of the front brake lever 11 and the rear brake lever 12.

With the first embodiment and the variation thereof, a direction in which the fastening portion 42 or 142 is offset from a center portion of the mounting portion 40 or 140 reverses in an axial direction of the handlebar 4 depending on whether the mounting member 32 or 132 is attached to the handlebar 4 in the first mounting orientation or the second mounting orientation. Consequently, the position of the support member 30 or 130 fastened to the fastening portion 42 or 142 can be easily changed relative to the mounting portion 40 or 140 in an axial direction of the handlebar 4 by changing whether the mounting member 32 or 132 is attached in the first mounting orientation or the second mounting orientation. Also, the fastening of the mounting member 32 or 132 to the handlebar 4 and the fastening of the support member 30 or 130 to the mounting member take place at different portions of the mounting member 32 or 132. Consequently, after it has been mounted to the handlebar 4, the rear gear shifter unit 16 (or the front gear shifter unit 15) will not easily move in an axial direction even if the connection between the mounting member 32 or 132 and the support member 30 or 130 loosens.

Figure 10:
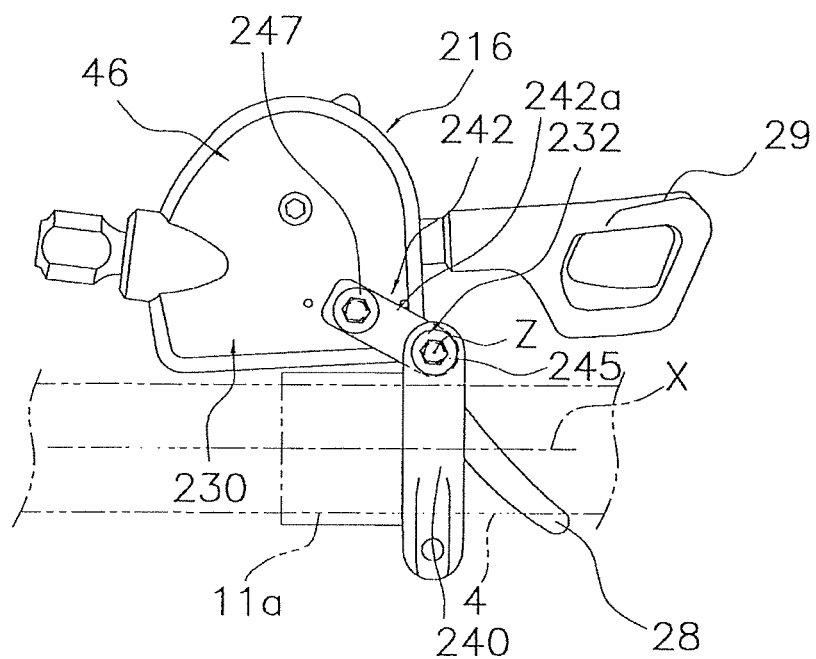
FIG. 10 shows a second embodiment and corresponds to FIG. 6.
Figure 11:
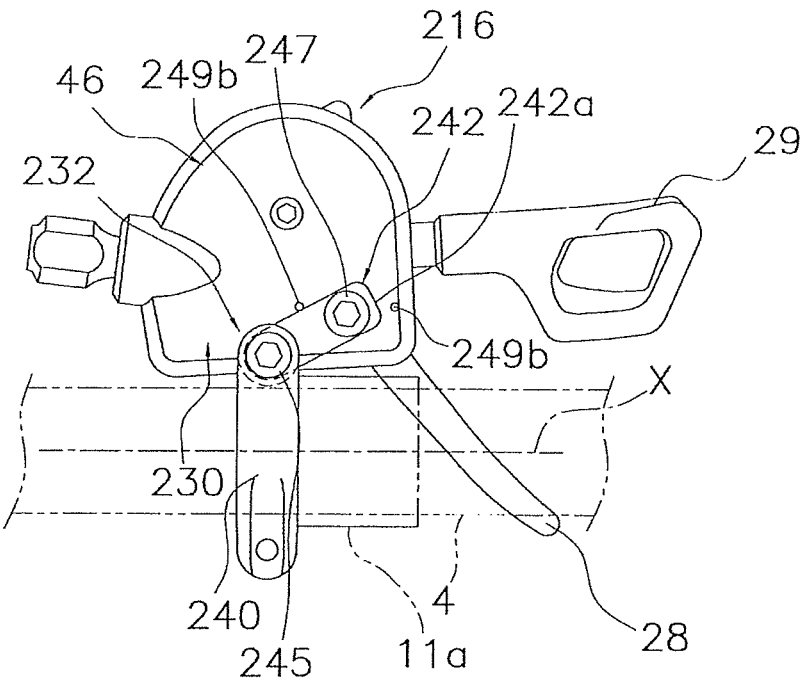
FIG. 11 shows the second embodiment and corresponds to FIG. 7.

FIGS. 10 and 11 show a rear gear shifter unit 216 according to a second embodiment. The rear gear shifter unit 216 includes the winding lever 28, the release lever 29 of the first embodiment as well as a support member 230 and a mounting member 232. The mounting member 232 has a mounting portion 240 and a fastening portion 242. The mounting portion 240 is configured to be mounted to the handlebar 4. The fastening portion 242 is configured to be fastened to the mounting portion 240 in such a manner that the fastening portion 242 is can pivot about a axis Z that is not parallel to the axis X of the handlebar 4. The fastening portion 242 is configured such that the fastening portion 242 can fasten the support member 230. In the second embodiment, the axis Z is an axis that is skew with respect to the axis X. The fastening portion 242 has a link member 242a that is attached to the mounting portion 240 such that the link member 242a can pivot about the axis Z. More specifically, one end of the link member 242a is pivotally attached to the mounting portion 240 with a first bolt member 245. The other end of the link member is pivotally attached to the support member 230 with a second bolt member 247. In order to make the release lever 29 easier to operate, a position where the link member 242a is attached to the mounting portion 240 is not aligned with a plane emanating radially from the axis X of the handle lever 4. Instead, the position where the link member 242a is attached is offset farther downward (direction oriented into the plane of the paper in FIG. 8). The link member 242a is prevented from rotating by two rotation preventing portions 249b configured to protrude from an upper surface of the housing 46.

In the second embodiment, the mounting member 232 onto which the support member 230 is fastened can be selectively attached to the handlebar 4 in either a first mounting orientation shown in FIG. 10 or a second mounting orientation shown in FIG. 11. In the second mounting orientation, the link member 242a is pivoted in a clockwise direction with respect to the mounting portion 240 from the first mounting orientation. The second mounting orientation is a position where the link member 242a is symmetrical to the first mounting orientation with respect to a straight line that passes through a fastening center of the first bolt member 245 and perpendicular to the axis X.

Thus, in the second embodiment, the position of the fastening portion 242 with respect to the mounting portion 240 can be changed along an axial direction of the handlebar 4 by changing a pivot angle of the fastening portion 242. Also, if the fastening portion 242 is pivoted from one position to another position that is linearly symmetrical to the one position with respect to a straight line passing through a pivot center (the center axis of the first bolt member 245) and perpendicular to the axis X, then a distance between the fastening portion 242 and the axis X of the handlebar 4 can be made to remain constant.

Figure 12:
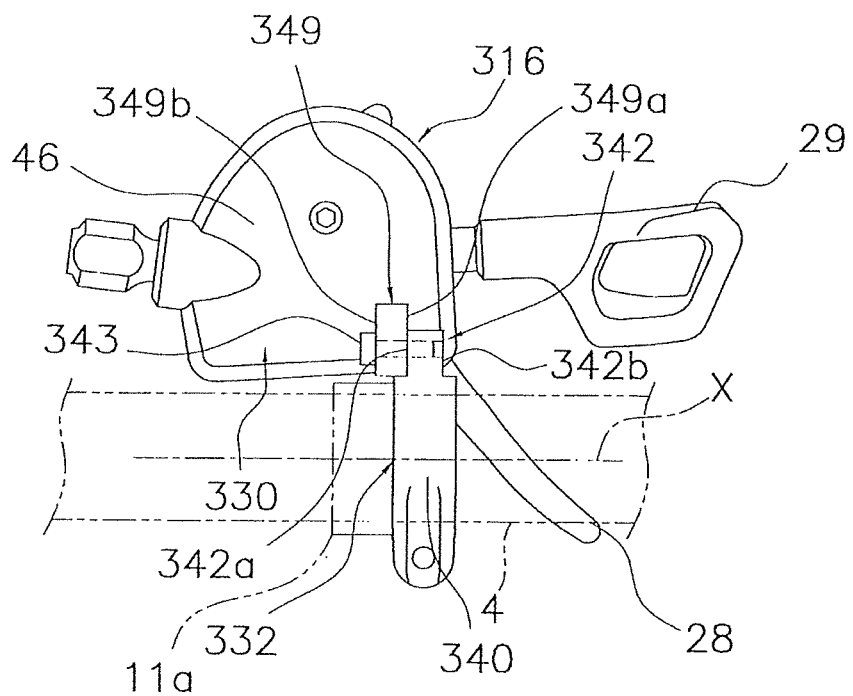
FIG. 12 shows a third embodiment and corresponds to FIG. 6.
Figure 13:
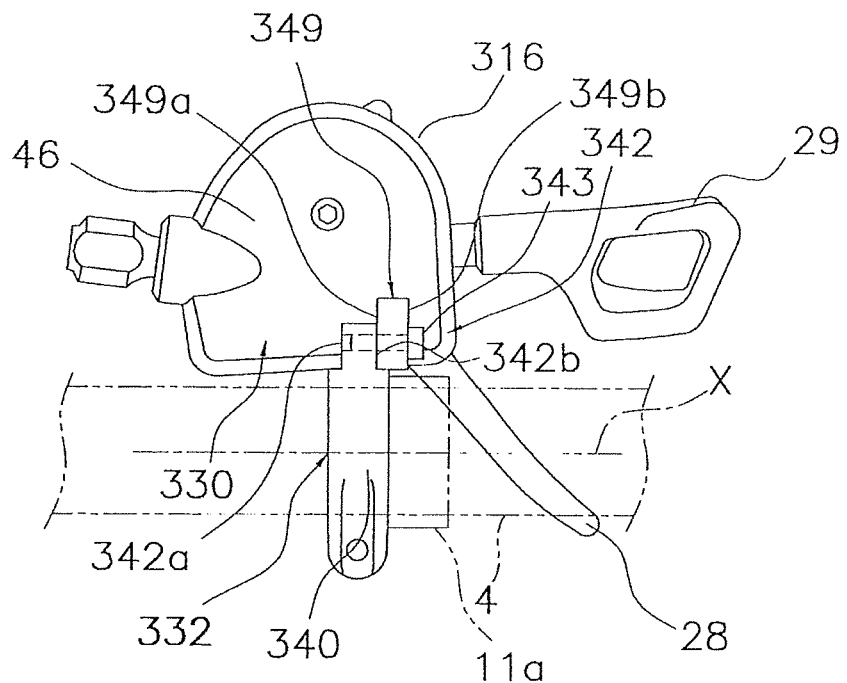
FIG. 13 shows the third embodiment and corresponds to FIG. 7.

FIGS. 12 and 13 show a rear gear shifter unit 316 according to a third embodiment. The rear gear shifter unit 216 includes the winding lever 28, the release lever 29 of the first embodiment as well as a support member 330 and a mounting member 332. The support member 330 supports the winding lever 28 and the release lever 29. The support member 330 has a first mounting surface 349a and a second mounting surface 349b. The second mounting surface 349b is separated from the first mounting surface 349a in an axial direction of the handlebar 4. Also the second mounting surface 349b does not lie and the same plane as the first mounting surface 349a. The first mounting surface 349a and the second mounting surface 349b lie in planes that are not parallel to the axis X of the handlebar 4. In the third embodiment, the first mounting surface 349a and the second mounting surface 349b lie in planes that are perpendicular to the axis X of the handlebar 4. However, it is acceptable if the first mounting surface 349a and the second mounting surface 349b are not planar surfaces but, instead, are curved surfaces, e.g., circular arc-shaped surfaces or spherical surfaces. The first mounting surface 349a and the second mounting surface 349b are formed on two faces of a mounting bracket 349 configured and arranged to protrude upward from an upper surface of the housing 46. More specifically, the first mounting surface 349a and the second mounting surface 349b are formed on two faces of the mounting bracket 349 that face in opposite axial directions of the handle bar 4.

The fastening portion 342 of the mounting member 332 has a first fastening surface 342a and a second fastening surface 342b. The first fastening surface 342a is arranged and configured for fastening the first mounting surface 349a of the support member 330 against the first fastening surface 342a. The second fastening surface 342b is arranged and configured for fastening the second mounting surface 349b of the support member 330 against the second fastening surface 342b. Since it is not necessary to invert the mounting member 332, the positions where the mounting member 332 and the support member 330 are fastened is not arranged to be aligned with a plane emanating radially from the axis X of the handlebar 4. The support member 330 is fastened to the fastening portion 342 with a fastening bolt 343.

With the third embodiment, the support member 330 can be selectively fastened to the mounting member 332 in either a first mounting orientation shown in FIG. 12 or in a second mounting orientation shown in FIG. 13. As shown in FIG. 12, in the first mounting orientation, the support member 330 is fastened with the fastening bolt 343 such that the first mounting surface 349a contacts the first fastening surface 342a. As shown in FIG. 13, in the second mounting orientation, the support member 330 is fastened with the fastening bolt 343 such that the second mounting surface 349b contacts the second fastening surface 342b.

Figure 14:
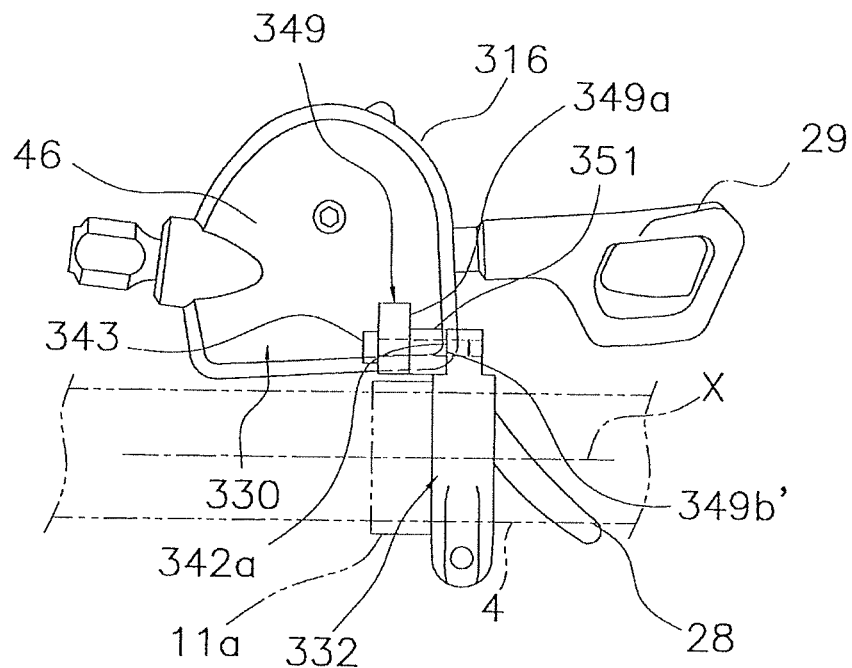
FIG. 14 shows a variation of the third embodiment and corresponds to FIG. 7.
Figure 15:
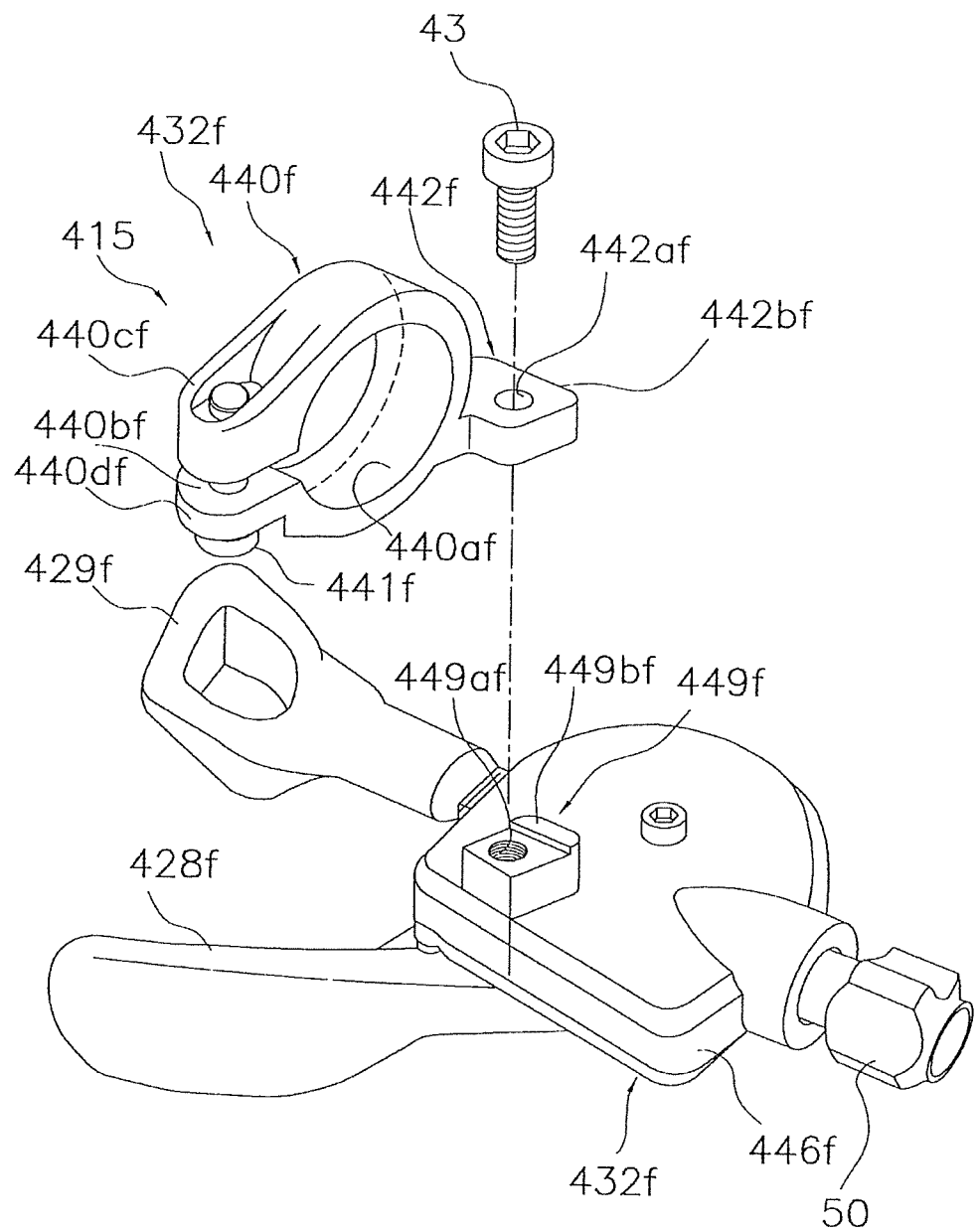
FIG. 15 is an exploded view of a front gear shifter unit according to a fourth embodiment and corresponds to FIG. 4.

FIG. 14 shows a variation in which an adjusting member 351 is arranged between the first mounting surface 349a and the first fastening surface 342a. In this variation, the support member 330 is fastened such that the first fastening surface 342a of the mounting member 332 contacts a second mounting surface 349' provided on the adjusting member 351. Meanwhile, when the mounting member 332 is arranged on an inward side of the front brake bracket 11a, the first fastening surface 342a is fastened directly to the first mounting surface 349a without using the adjusting member. In this variation, the length of the fastening bolt 343 needs to be sufficient to compensate for the thickness of the adjusting member 351. In the third embodiment, the first mounting surface 349a and the second mounting surface 349b (349b') are arranged in different planes that are separated in an axial direction of the handlebar 4. Consequently, the position of the support member 330 with respect to the mounting portion 340 can be easily changed in an axial direction of the handlebar 4 by attaching the support member 330 with the first mounting surface 349a against the fastening portion 342 or with the second mounting surface 349b against the fastening portion 342. Also, the fastening of the mounting member 332 to the handlebar 4 and the fastening of the support member 330 to the mounting member 332 take place at different portions of the mounting member 332. As a result, the gear shift operating device will not easily move after it has been mounted, even if the connection between the support member 330 and the mounting member 332 loosens.

FIGS. 15 to 19 show a front gear shifter unit 415 and a rear gear shifter unit 416 according to a fourth embodiment. In the first to third embodiments, the position of the rear gear shifter unit is adjusted in an axial direction (axis X) of the handlebar 4 by changing an orientation in which the mounting member 32, 132 or 332 is attached to the handlebar 4. In this fourth embodiment, however, a mounting member is changed (exchanged) depending on whether the front gear shifter unit 415 (e.g., a gear shift operating device) or the rear gear shifter unit 416 (e.g., a gear shift operating device) is being installed.

In the following explanation, parts of the front gear shifter unit 415 that are the same as the parts of the rear gear shifter unit 416, but are mirror images, are indicated with the same reference numeral in the 400s except that an "f" is added. However, parts of the front gear shifter unit 415 that are not mirror images of the parts of the rear gear shifter unit 416, but instead are shaped identically to the parts of the rear gear shifter unit 416, are indicated with the same reference numerals as the rear gear shifter unit 416. In the fourth embodiment, the rear gear shifter unit 416 and the front gear shifter unit 415 are basically configured to be mirror images of each other.

The rear gear shifter unit 416 has a winding lever 428, a release lever 429, a support member 430 and a mounting member 432 serving to attach the support member 430 to the handlebar 4. The front gear shifter unit 415 has a winding lever 428f, a release lever 429f, a support member 430f and a mounting member 432f serving to attach the support member 430f to the handlebar 4. These component parts of the front gear shifter unit 415 are configured to be mirror images of the corresponding parts of the rear gear shifter unit 416 as explained previously.

The mounting member 432f has a mounting portion 440f configured to be attached to the handlebar 4, and a fasting portion 442f configured for the support member 430f to be fastened thereto. The fastening portion 442f is arranged below a plane that emanates radially from the axis X of the handlebar 4. The fastening portion 442 of the rear gear shifter unit 416 (see FIG. 16) is also arranged below a plane that emanates radially from the axis X of the handlebar 4.

The support member 430f has a mounting bracket 449f, which is basically the same as the mounting bracket 49 of the first embodiment, except that the mounting bracket 449f has a smaller height. Consequently, the mounting bracket 449f is merely indicated with a reference numeral in the 400s and an explanation thereof is omitted for brevity.

Figure 16:
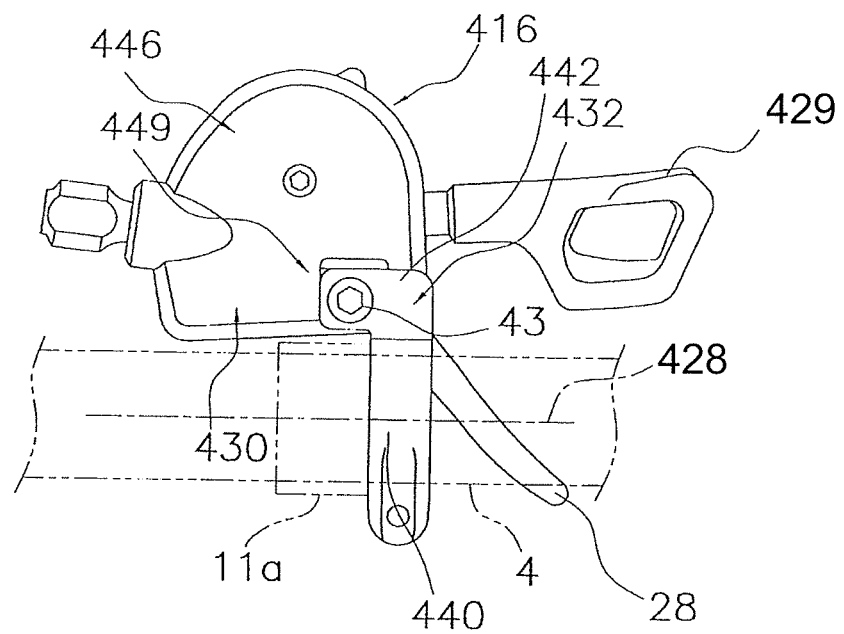
FIG. 16 shows a rear gear shifter unit according to the fourth embodiment and corresponds to FIG. 6.
Figure 17:
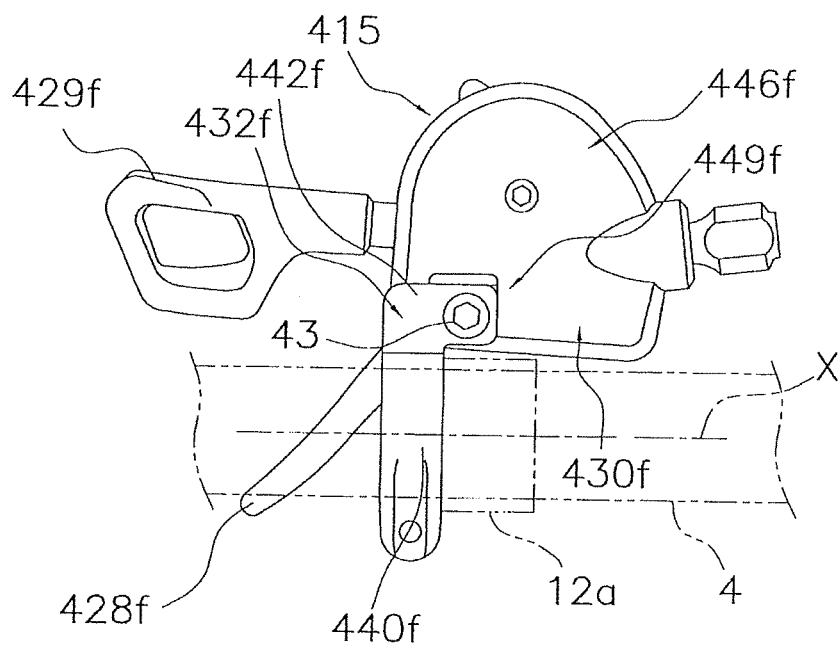
FIG. 17 shows a front gear shifter unit according to the fourth embodiment and corresponds to FIG. 6.
Figure 18:
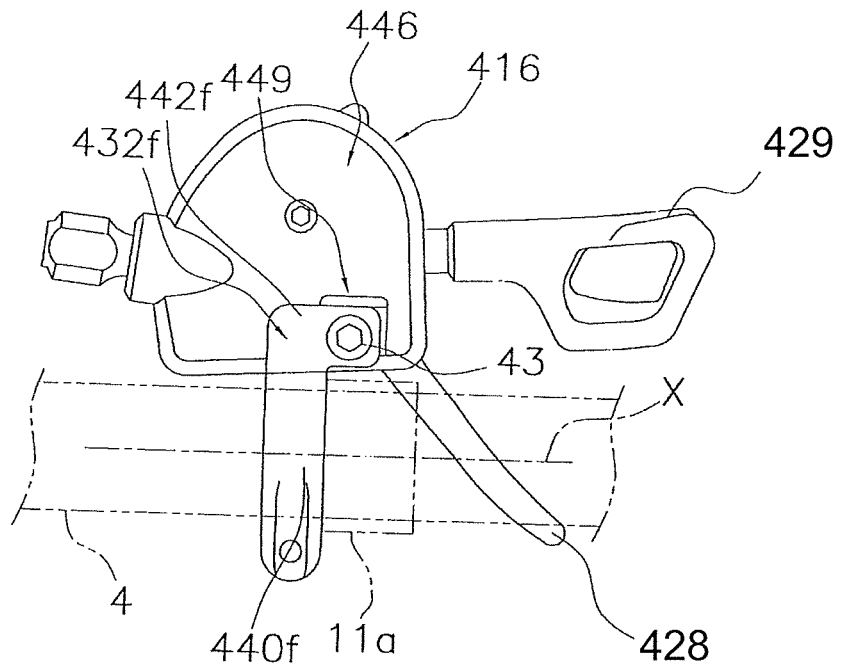
FIG. 18 shows a rear gear shifter unit according to the fourth embodiment and corresponds to FIG. 7.
Figure 19:
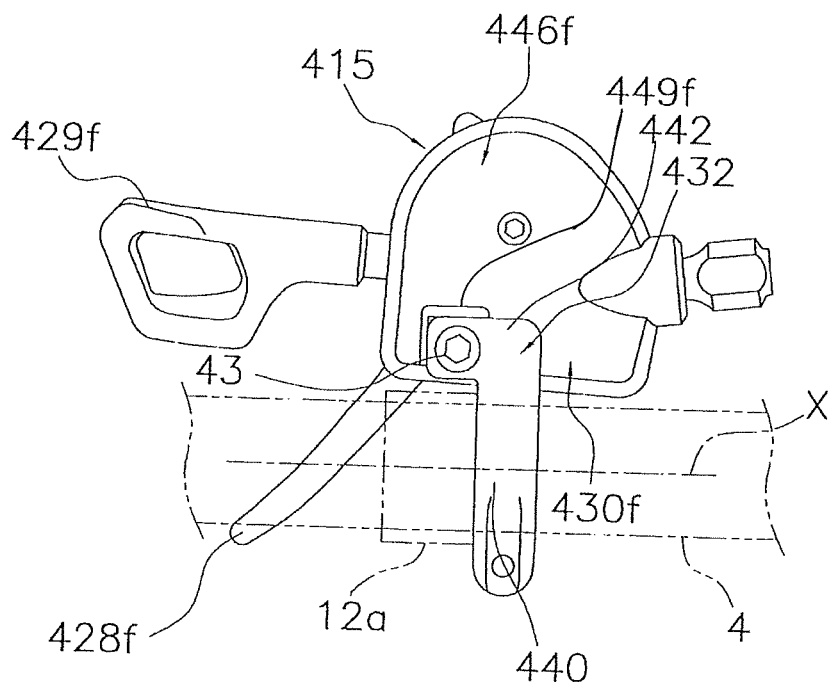
FIG. 19 shows a front gear shifter unit according to the fourth embodiment and corresponds to FIG. 7.

FIGS. 16 and 17 show a first mounting orientation in which the front brake bracket 11a is arranged on an inward side of the mounting portion 440 and the rear brake bracket 12a is arranged on the inward side of the mounting portion 440f. FIGS. 18 and 19 show a second mounting orientation in which the front mounting member 432f and the rear mounting member 432 are switched such that the front brake bracket 11a is arranged on an outward side of the mounting portion 440f and the rear brake bracket 12a is arranged on the outward side of the mounting portion 440. Thus, the relative positions of the front and rear support members 430f and 430 with respect to the mounting portions 440f and 440 can be changed easily in an axial direction of the handlebar 4 by switching the mounting members 432f and 432. In the second mounting orientation shown in FIGS. 18 and 19, the mounting member 432f is arranged on an outward side of the front brake bracket 11a and the mounting member 432 is arranged on an outward side of the rear brake bracket 12a.

With the fourth embodiment, the mounting positions of the gear shifters 415 and 416 can be changed easily by changing between a configuration in which the front support member 430f is fastened to the rear mounting member 432 and the rear support member 430 is fastened to the front mounting member 432f and a configuration in which the front support member 430f is fastened to the front mounting member 432f and the rear support member 430 is fastened to the rear mounting member 432. Also, the fastening of the mounting member 432 or 432f to the handlebar 4 and the fastening of the support member 430 or 430f to the mounting member 432 or 432f take place at different portions of the mounting member 432 or 432f. As a result, the front gear shifter unit 415 and the rear gear shifter unit 416 will not easily move after they have been mounted, even if the connection between the support member and the mounting member loosens.

Although in the previously explained embodiments, a bolt member is used as a fastening member, the gear shift operating device is not limited to using a bolt as a fastening member. For example, a nut or an elastic latching structure can also be used as a fastening member.

Also although in the previously explained embodiments the gear shift operating device is explained using a rear gear shifter unit as an example, the gear shift operating device can be applied in the same manner to a front gear shifter unit.

In addition, although in the first embodiment the fastening portion 42 is arranged to be aligned with a plane P that emanates radially from an axis X of the handlebar 4, the fastening portion 42 can also be arranged above or below the plane P. In such case, a spacer can be inserted between the fastening portion and the mounting bracket to adjust the height in a vertical direction.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the gear shift operating device. Accordingly, these terms, as utilized to describe the gear shift operating device should be interpreted relative to a bicycle equipped with the gear shift operating device as used in the normal riding position on flat ground. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A gear shift operating device comprising:
   an operating member;
   a support member supporting the operating member; and
   a mounting member attached to the support member, the mounting member including a handlebar mounting portion and a fastening portion, the handlebar mounting portion configured to define a handlebar mounting axis,
   the fastening portion extending from the handlebar mounting portion such that the fastening portion is fastened to the support member at a position offset in an axial direction of the handlebar mounting axis from an axial middle location of the mounting portion with the axial middle location of the mounting portion being defined with respect to the axial direction of the handlebar mounting axis,
   the fastening portion and the support member being selectively arranged with respect to each other between a first mounting orientation in which the fastening portion is fastened to the support member at a position offset in a first axial direction of the handlebar mounting axis from the middle location and a second mounting orientation in which the support member is fastened to the support member at a position offset from the middle location in a second axial direction that is opposite the first axial direction,
   the fastening portion having first and second attachment surfaces facing in opposite directions, the first and second attachment surfaces selectively contacting the support member such that only the first attachment surface contacts the support member in the first mounting orientation, and such that only the second attachment surface contacts the support member in the second mounting orientation,
   an orientation of the operating member with respect to the handlebar mounting axis remaining unchanged between the first and second mounting orientations except that the operating member is moved along the axial direction between the first and second mounting orientations.

2. The gear shift operating device as recited in claim 1, wherein
   the fastening portion is arranged with a centerline that is aligned with a plane that emanates radially from the handlebar mounting axis.

3. The gear shift operating device as recited in claim 1 or 2, wherein
   the support member includes a rotation preventing portion that prevents rotation of the support member with respect to the mounting member.

* * * * *